(12) United States Patent
Xu et al.

(10) Patent No.: US 11,049,032 B2
(45) Date of Patent: Jun. 29, 2021

(54) DETERMINING CORRELATIONS BETWEEN TYPES OF USER IDENTIFYING INFORMATION MAINTAINED BY AN ONLINE SYSTEM

(71) Applicant: Facebook, Inc., Menlo Park, CA (US)

(72) Inventors: Liang Xu, Bellevue, WA (US); Li Zhou, Campbell, CA (US)

(73) Assignee: Facebook, Inc., Menlo Park, CA (US)

( * ) Notice: Subject to any disclaimer, the term of this patent is extended or adjusted under 35 U.S.C. 154(b) by 980 days.

(21) Appl. No.: 15/685,121

(22) Filed: Aug. 24, 2017

(65) Prior Publication Data
US 2019/0065977 A1    Feb. 28, 2019

(51) Int. Cl.
*G06N 7/00* (2006.01)
*H04L 29/08* (2006.01)

(52) U.S. Cl.
CPC .............. *G06N 7/005* (2013.01); *H04L 67/22* (2013.01); *H04L 67/306* (2013.01); *H04L 67/10* (2013.01); *H04L 67/20* (2013.01)

(58) Field of Classification Search
CPC .......... G06F 17/3053; G06F 17/30867; G06N 7/005; H04L 67/22; H04L 67/10; H04L 67/20

See application file for complete search history.

(56) References Cited

U.S. PATENT DOCUMENTS

| | | | |
|---|---|---|---|
| 2005/0278365 A1* | 12/2005 | Boucousis | G06F 16/367 |
| 2014/0282230 A1* | 9/2014 | Sorin | G06F 3/0484 |
| | | | 715/790 |
| 2018/0260432 A1* | 9/2018 | Katz | G06F 16/2365 |
| 2019/0342289 A1* | 11/2019 | Zhu | H04L 63/0884 |

* cited by examiner

*Primary Examiner* — Paulinho E Smith
(74) *Attorney, Agent, or Firm* — Fenwick & West LLP

(57) ABSTRACT

An online system maintains an identity graph having links between different types of user identifying information (e.g., email addresses, phone numbers, user identifiers) describing various users of the online system. Based on information received from various sources describing relationships between different types of user identifying information describing a user, the online system generates confidence values for each link between different types of user identifying information. In some embodiments, a confidence value accounts for an amount of time since information describing a relationship between different types of user identifying information was received from a source. If the confidence value of a link between different types of user identifying information equals or exceeds a threshold value, the online system determines the different types of user identifying information are correlated with each other, allowing the online system to correlate user identifying information without storing user identifying information received from sources.

20 Claims, 3 Drawing Sheets

DETERMINING CORRELATIONS BETWEEN TYPES OF USER IDENTIFYING INFORMATION MAINTAINED BY AN ONLINE SYSTEM

BACKGROUND

This disclosure relates generally to identifying users of an online system, and more particularly to identifying accuracies with which different types of user identifying information identify online system users.

Users interact with content provided by a variety of online systems, and multiple online systems may exchange limited information associated with a user to allow each online system to provide a user with more personalized content. Providing more personalized content enhances user interaction with an online system, increasing the amount of user interaction with the online system. Different online systems maintain user identifying information associated with each user, user identifying information associated with a user including different types of user identifying information.

To retrieve information associated with a user from an additional online system, an online system communicates one or more types of user identifying information associated with the user by the online system to the additional online system. The additional online system compares the received type of user identifying information to user identifying information associated with users of the additional online system an identifies a user of the additional online system associated with types of user identifying information matching the received types of user identifying information. However, different online systems may use different types of user identifying information to identify specific user, so an online system may be unable to accurately identify a user based on user identifying information received from an additional online system.

SUMMARY

An online system maintains multiple types of user identifying information describing various users of the online system. For example, the online system maintains multiple types of user identifying information in a user profile associated with each user of the online system. Example types of user identifying information include: a name, a date of birth, an e-mail address, a gender, a location, an address, an online system user identifier, a phone number, an identifier maintained by a third party system or an application, a device identifier of a client device, and any other suitable information. In various embodiments, a user provides one or more types of user identifying information to the online system, which maintains the types of user identifying information in a user profile of the user. Additionally, client devices, third party systems, or applications may provide one or more types of user identifying information that the online system maintains in a user profile of the user. For example, the online system includes an online system user identifier in a user profile, and maintains other types of user identifying information provided by the user or received from applications or third party systems in the user profile.

Additionally, the online system maintains links between different types of user identifying inform action maintained for the user and describing the user. A link between a type of user identifying information and an alternative type of user identifying information is based on relationships between the type of user identifying information and the alternative type of user identifying information that the online system receives from various sources. A relationship between the type of user identifying information and the alternative type of user identifying information received from a source is an indication that the source has correlated the type of user identifying information with the and the alternative type of user identifying information. As further described above, a source identifies a device (e.g., a third party system, a client device) from which the online system receives a relationship between different types of user identifying information and may additionally or alternatively identify a mechanism by which the online system received the relationship (e.g., instructions included in content presented by the online system that, when executed by a client device, cause the client device to transmit the relationship between types of user identifying information or receiving information from a client device identifying an action performed by the user along with the relationship between types of user identifying information). In various embodiments, the online system receives a relationship between different types of user identifying information from a source when the source provides information to the online system for association with a user (e.g., a content item, an action, etc.).

As the online system receives relationships between a type of user identifying information and an alternative type of user identifying information, the online system determines a number of received relationships indicating the type of user identifying information is correlated with the alternative type of user identifying information. An indication that the type of user identifying information is correlated with the alternative type of user identifying information indicates that the type of user identifying information and the alternative type of user identifying information describe the same user, or that the type of user identifying information may be used to identify the alternative type of user identifying information (or vice versa). In various embodiments, the online system determines a number of received relationships indicating the type of user identifying information is correlated with the alternative type of user identifying information that were received from at least a threshold number of sources. For example, the online system determines a number of received relationships indicating the type of user identifying information is correlated with the alternative type of user identifying information that were received from at least two sources; hence, an indication the type of user identifying information is correlated with the alternative type of user identifying information received from a single source is not used to determine the number.

Additionally or alternatively, the online system may identify indications the type of user identifying information is correlated with the alternative type of user identifying information received from sources that that the online system has previously determined to be trusted or to have provided relationships between different types of user identifying information with at least a threshold accuracy. The accuracy of relationships between types of user identifying information identified by a source may be determined by a trusted third party system that receives relationships from the source, determines accuracies of the relationships based on additional information, and generates an accuracy for the source. The trusted third party system subsequently provides the online system with accuracies for various sources. Alternatively, the online system may determine accuracies of various sources based on relationships between different types of user identifying information received from the sources over one or more time intervals by comparing the relationships received from a source to relationships between different types of user identifying information received from other sources or maintained by the online system.

Based on the determined number of received relationships indicating the type of user identifying information is correlated with the alternative type of user identifying information, the online system generates a confidence value for the maintained link between the type of user identifying information and the alternative type of user identifying information. In various embodiments, the online system trains one or more models to generate the confidence value based on the number of received relationships indicating the type of user identifying information is correlated with the alternative type of user identifying information that were received as well as the type of user identifying information and the alternative type of user identifying information. For example, a model accounts for a frequency with which various users modify the user identifying information or the alternative type of user identifying information.

Additionally, a model generating the confidence value accounts for a source from which a relationship indicating the type of user identifying information is correlated with the alternative type of user identifying information was received. For example, a model weights an indication the type of user identifying information is correlated with the alternative type of user identifying information received from a source by an accuracy of the source; the model generates the confidence value based on a combination of the indications the type of user identifying information is correlated with the alternative type of user identifying information weighted based on accuracies of sources from which the indications were received. In various embodiments, the model accounts for any suitable characteristic of sources from which indications the type of user identifying information is correlated with the alternative type of user identifying information was received and weights indications the type of user identifying information is correlated with the alternative type of user identifying information by the characteristics of the source from which each indication was received. For example, the online system associates higher weights with sources that are instructions included in content presented by the online system that, when executed by a client device, cause the client device to transmit the relationship between types of user identifying information or that is a relationship received from a client device along with an action performed by the user than with other sources. As another example, the online system associates higher weights with sources that are specific third party systems (e.g., third party systems providing at least a threshold number of relationships to the online system) than with other third party systems.

The online system stores the confidence value in association with the link between the type of user identifying information and the alternative type of user identifying information in various embodiments. Alternatively, the online system compares the confidence value to a threshold and stores the confidence value in association with the link between the type of user identifying information and the alternative type of user identifying information if the confidence value equals or exceeds the threshold value. This allows the online system to identify whether the type of user identifying information may be accurately identified from the alternative type of user identifying information, or vice versa.

Additionally, the online system modifies the confidence value associated with the link between the type of user identifying information and the alternative type of user identifying information over time in various embodiments. For example, the online system modifies the confidence value based on time differences between a current time and times when the online system received various relationships between the type of user identifying information and the alternative type of user identifying information. In various embodiments, the online system attenuates the confidence value associated with the link as the time difference between a time when an indication the type of user identifying information and the additional type of user identifying information was received and the current time increases. For example, the online system applies a decay factor to the confidence value associated with the link between the type of user identifying information and the alternative type of user identifying information. In various embodiments, the online system applies a decay factor to the confidence value determined based on the type of user identifying information or the alternative type of user identifying information. This allows the online system to differently attenuate different types of user identifying information, accounting for different frequencies with which various types of user identifying information may change. For example, the online system applies a greater decay factor to an identifier maintained by a third party system or application than to an address, as the address is more likely to change over time than the identifier maintained by the third party system. Modifying the confidence value associated with the link over time allows the online system to more accurately determine whether the type of user identifying information may be identified from the alternative type of user identifying information, and vice versa, over time.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
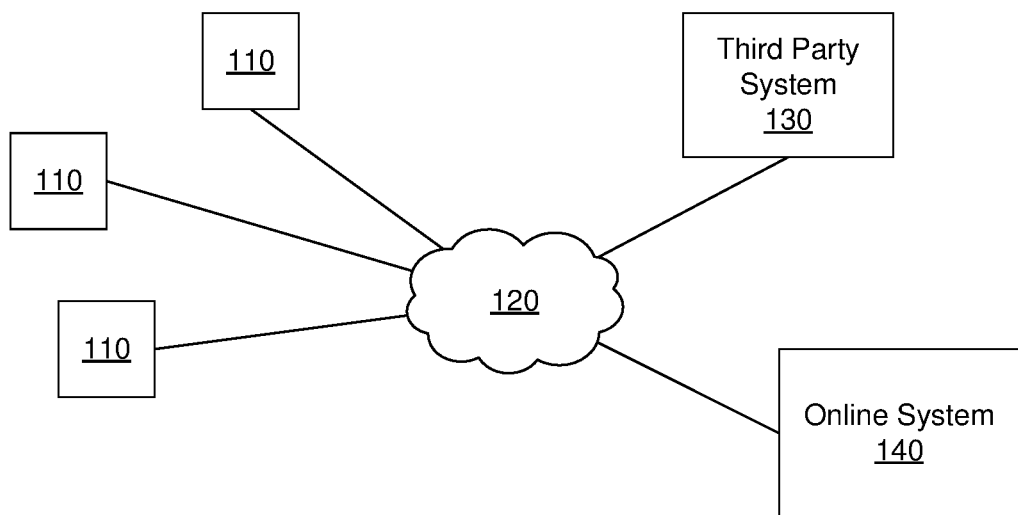
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In some embodiments, one or more third party systems 130 may be directly coupled to each other and/or to the online system 140. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
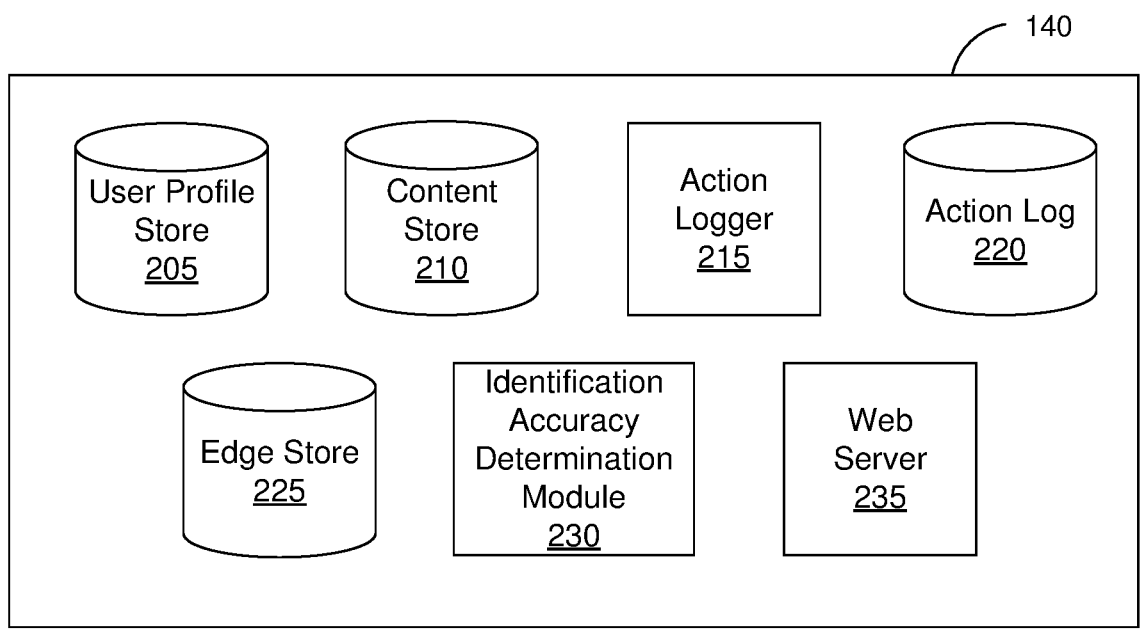
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an identification accuracy determination module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture. In various embodiments, the online system 140 is a social networking system, a content Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce web sites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The identification accuracy determination module 230 determines confidence values for links between different types of user identifying information that describe a user of the online system 140. In various embodiments, the online system 140 maintains different types of user identifying information for each user. Example types of user identifying information include: a name, a date of birth, an e-mail address, a gender, a location, an address, an online system user identifier, and a phone number; however, the online system 140 may maintain any suitable type of user identifying information for a user. This allows the online system 140 to identify a user corresponding to user identifying information received from a source, such as a third party system 130 or a client device 110. However, different types of user identifying information may be correlated with each other, so the online system 140 maintains links between different types of user identifying information. This allows the online system 140 to identify a type of user identifying information when an alternative type of user identifying information is received; for example, the online system 140 receives an e-mail address describing a user and identifies an address describing the user from the e-mail address based on a link between the e-mail address and the address. However, different types of user identifying information have varying correlations to other types of user identifying information, so the online system 140 may not be able to reliably identify another type of user identifying information based on a particular type of user identifying information.

To improve an accuracy of identifying other types of user identifying information from a particular type of user identifying information, the identification accuracy determination module 230 includes a confidence value in each link between different types of user identifying information maintained for a user. The confidence value of a link between a type of user identifying information and an alternative type of user identifying information provides a measure of a likelihood of the type of user identifying information being correlated with the alternative type of user identifying information. For example, a confidence value of a link between an e-mail address and an address indicates a likelihood of identifying the address when the e-mail address is received by the online system 140, or vice versa. As further described below in conjunction with FIG. 3, the identification accuracy determination module 230 generates a confidence value for a link between a type of user identifying information and an alternative type of user identifying information based on relationships between the type of user identifying information and the alternative type of user identifying information received from a set of sources. Example sources include third party systems 130 or client devices 110. Additionally, a source includes a mechanism by which the online system 140 received a relationship between the type of user identifying information and the alternative type of user identifying information. Example mechanisms include receiving a relationship from a client device 110 that executed instructions included in content presented by the online system 140 causing the client device 110 to transmit the relationship between types of user identifying information or receiving information from a client device 110 identifying an action performed by the user along with the relationship between types of user identifying information.

Based on relationships received from sources that indicate the type of user identifying information is correlated with the alternative type of user identifying information, the identification accuracy determination module 230 generates the confidence value for the link between the type of user identifying information and the alternative type of user identifying information. As further described below in conjunction with FIG. 3, the identification accuracy determination module 230 determines a number of received relationships the type of user identifying information is correlated with the alternative type of user identifying information and generates the confidence value for the link between the type of user identifying information and the alternative user identifying information based on the determined number. In various embodiments, the confidence value is directly related to the number of received relationships the type of user identifying information is correlated with the alternative type of user identifying information. The information accuracy determination module 230 accounts for characteristics of sources from which relationships between the type of user identifying information and the alternative user identifying information were received or times when relationships between the type of user identifying information and the alternative type of user identifying information were received in various embodiments. In some embodiments, the information accuracy determination module 230 stores the generated confidence value in association with the link between the user identifying information and the alternative user identifying information. Alternatively, the information accuracy determination module 230 stores the generated confidence value in association with the link if the confidence value equals or exceeds a threshold. Additionally, the information accuracy determination module 230 may modify the confidence value over time, as further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
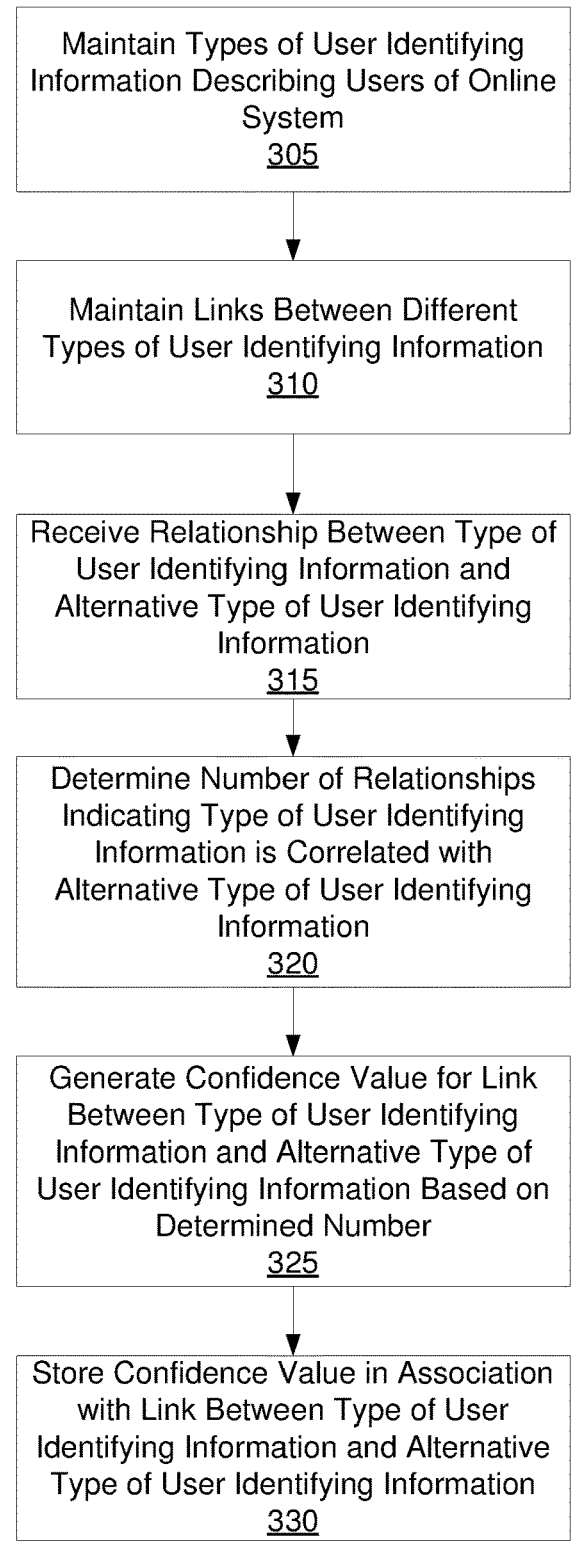
FIG. 3 is a flowchart of a method for determining measures of confidence of different types of user identifying information identifying an online system user, in accordance with an embodiment.

Determining Correlations Between Types of User Identifying Information Describing a User FIG. 3 is a flowchart of one embodiment of a method for determining measures of confidence of different types of user identifying information identifying an online system user. In other embodiments, the method may include different and/or additional steps than those shown in FIG. 3. Additionally, steps of the method may be performed in different orders than the order described in conjunction with FIG. 3 in various embodiments.

The online system 140 maintains 305 multiple types of user identifying information describing various users of the online system 140. For example, the online system 140 maintains 305 multiple types of user identifying information in a user profile associated with each user of the online system 140. Example types of user identifying information include: a name, a date of birth, an e-mail address, a gender, a location, an address, an online system user identifier, a phone number, an identifier maintained by a third party system 130 or an application, a device identifier of a client device 110, and any other suitable information. In various embodiments, a user provides one or more types of user identifying information to the online system 140, which maintains 305 the types of user identifying information in a user profile of the user. Additionally, client devices 110, third party systems 130, or applications may provide one or more types of user identifying information that the online system 140 maintains 305 in a user profile of the user. For example, an application associated with the online system 140 provides a device identifier and a relationship between the device identifier and an online system user identifier to the online system 140; hence, the online system 140 includes the device identifier in a user profile including the online system user identifier. For example, the online system 140 includes an online system user identifier in a user profile, and maintains 305 other types of user identifying information provided by the user or received from applications or third party systems 130 in the user profile.

Additionally, the online system 140 maintains 310 links between different types of user identifying inform action maintained for the user and describing the user. A link between a type of user identifying information and an alternative type of user identifying information is based on relationships between the type of user identifying information and the alternative type of user identifying information that the online system 140 receives 315 from various sources. A relationship between the type of user identifying information and the alternative type of user identifying information received from a source is an indication that the source has correlated the type of user identifying information with the and the alternative type of user identifying information. As further described above, a source identifies a device (e.g., a third party system 130, a client device 110) from which the online system 140 receives 315 a relationship between different types of user identifying information and may additionally or alternatively identify a mechanism by which the online system 140 received 315 the relationship (e.g., instructions included in content presented by the online system 140 that, when executed by a client device 110, cause the client device 110 to transmit 315 the relationship between types of user identifying information or receiving information from a client device 110 identifying an action performed by the user along with the relationship between types of user identifying information). In various embodiments, the online system 140 receives 315 a relationship between different types of user identifying information from a source when the source provides information to the online system 140 for association with a user (e.g., a content item, an action, etc.).

As the online system 140 receives 315 relationships between a type of user identifying information and an alternative type of user identifying information, the online system 140 determines 320 a number of received relationships indicating the type of user identifying information is correlated with the alternative type of user identifying information. An indication that the type of user identifying information is correlated with the alternative type of user identifying information indicates that the type of user identifying information and the alternative type of user identifying information describe the same user, or that the type of user identifying information may be used to identify the alternative type of user identifying information (or vice versa). In various embodiments, the online system 140 determines 320 a number of received relationships indicating the type of user identifying information is correlated with the alternative type of user identifying information that were received 315 from at least a threshold number of sources. For example, the online system 140 determines 320 a number of received relationships indicating the type of user identifying information is correlated with the alternative type of user identifying information that were received 315 from at least two sources; hence, an indication the type of user identifying information is correlated with the alternative type of user identifying information received 315 from a single source is not used to determine 320 the number.

Additionally or alternatively, the online system 140 may identify indications the type of user identifying information is correlated with the alternative type of user identifying information received 315 from sources that that the online system 140 has previously determined to be trusted or to have provided relationships between different types of user identifying information with at least a threshold accuracy. The accuracy of relationships between types of user identifying information identified by a source may be determined by a trusted third party system 130 that receives relationships from the source, determines accuracies of the relationships based on additional information, and generates an accuracy for the source. The trusted third party system 130 subsequently provides the online system 140 with accuracies for various sources. Alternatively, the online system 140 may determine accuracies of various sources based on relationships between different types of user identifying information received 315 from the sources over one or more time intervals by comparing the relationships received 315 from a source to relationships between different types of user identifying information received 315 from other sources or maintained by the online system 140. Hence, the online system 140 determines 320 a number of received relationships indicating the type of user identifying information is correlated with the alternative type of user identifying information that were received 315 from sources having at least a threshold accuracy.

Based on the determined number of received relationships indicating the type of user identifying information is correlated with the alternative type of user identifying information, the online system 140 generates 325 a confidence value for the maintained link between the type of user identifying information and the alternative type of user identifying information. In various embodiments, the online system 140 trains one or more models to generate 325 the confidence value based on the number of received relationships indicating the type of user identifying information is correlated with the alternative type of user identifying information that were received 315 as well as the type of user identifying information and the alternative type of user identifying information. For example, a model accounts for a frequency with which various users modify the user identifying information or the alternative type of user identifying information.

Additionally, a model generating 325 the confidence value accounts for a source from which a relationship indicating the type of user identifying information is correlated with the alternative type of user identifying information was received 315. For example, a model weights an indication the type of user identifying information is correlated with the alternative type of user identifying information received 315 from a source by an accuracy of the source; the model generates 325 the confidence value based on a combination of the indications the type of user identifying information is correlated with the alternative type of user identifying information weighted based on accuracies of sources from which the indications were received 315. In various embodiments, the model accounts for any suitable characteristic of sources from which indications the type of user identifying information is correlated with the alternative type of user identifying information was received 315 and weights indications the type of user identifying information is correlated with the alternative type of user identifying information by the characteristics of the source from which each indication was received 315. For example, the online system 140 associates higher weights with sources that are instructions included in content presented by the online system 140 that, when executed by a client device 110, cause the client device 110 to transmit 315 the relationship between types of user identifying information or that is a relationship received from a client device 110 along with an action performed by the user than with other sources. As another example, the online system 140 associates higher weights with sources that are specific third party systems 130 (e.g., third party systems 130 providing at least a threshold number of relationships to the online system 140) than with other third party systems 130.

The online system 140 stores 330 the confidence value in association with the link between the type of user identifying information and the alternative type of user identifying information in various embodiments. Alternatively, the online system 140 compares the confidence value to a threshold and stores 330 the confidence value in association with the link between the type of user identifying information and the alternative type of user identifying information if the confidence value equals or exceeds the threshold value. This allows the online system 140 to identify whether the type of user identifying information may be accurately identified from the alternative type of user identifying information, or vice versa.

In various embodiments, the online system 140 receives values for the type of user identifying information and for the alternative type of user from sources when receiving 315 the relationship between the type of user identifying information and the alternative type of user identifying information. After generating 325 the confidence value for the link between the type of user identifying information and the alternative type of user identifying information, the online system 140 discards the received values of the type of user identifying information and of the alternative user identifying information. This allows the online system 140 to determine likelihoods of identifying a type of user identifying information when another type of user identifying information is received without storing values for different types of user identifying information received from various sources.

Additionally, the online system 140 modifies the confidence value associated with the link between the type of user identifying information and the alternative type of user identifying information over time in various embodiments. For example, the online system 140 modifies the confidence value based on time differences between a current time and times when the online system 140 received 315 various relationships between the type of user identifying information and the alternative type of user identifying information. In various embodiments, the online system 140 attenuates the confidence value associated with the link as the time difference between a time when an indication the type of user identifying information and the additional type of user identifying information was received and the current time increases. For example, the online system 140 applies a decay factor to the confidence value associated with the link between the type of user identifying information and the alternative type of user identifying information. In various embodiments, the online system 140 applies a decay factor to the confidence value determined based on the type of user identifying information or the alternative type of user identifying information. This allows the online system 140 to differently attenuate different types of user identifying information, accounting for different frequencies with which various types of user identifying information may change. For example, the online system 140 applies a greater decay factor to an identifier maintained by a third party system 130 or application than to an address, as the address is more likely to change over time than the identifier maintained by the third party system 130. Modifying the confidence value associated with the link over time allows the online system 140 to more accurately determine whether the type of user identifying information may be identified from the alternative type of user identifying information, and vice versa, over time.

Figure 4:
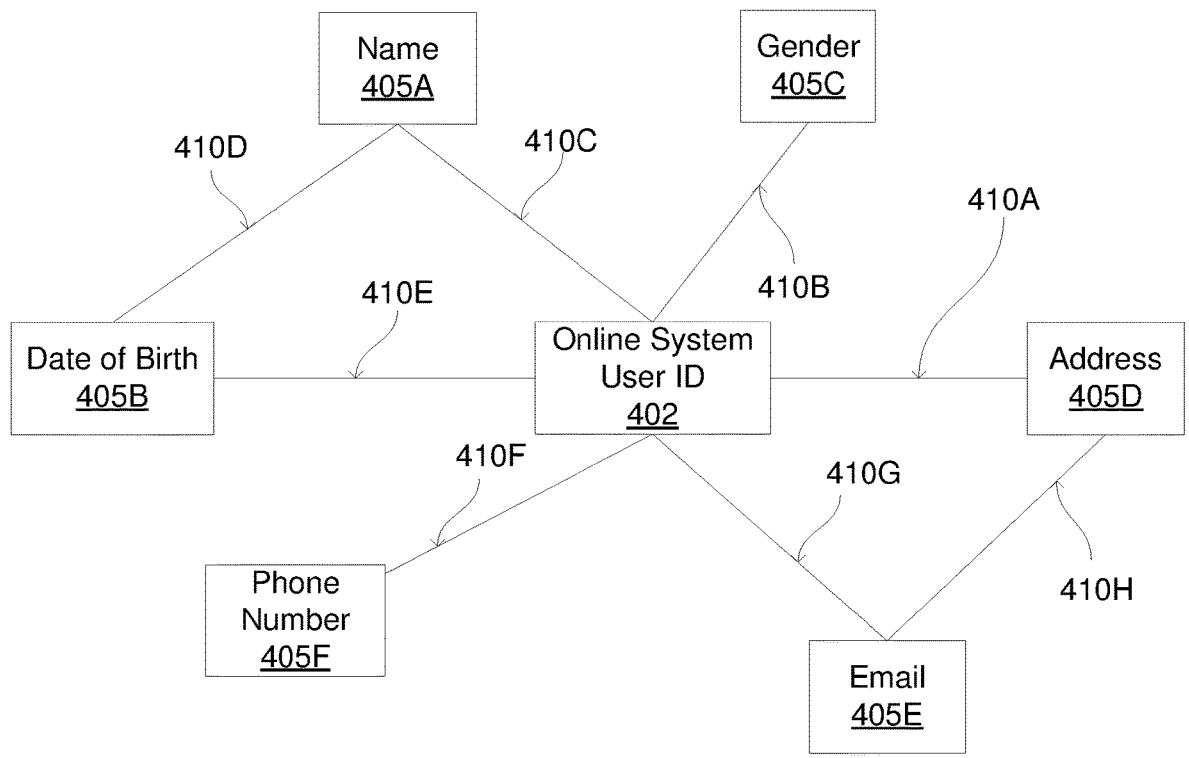
FIG. 4 is an example of determining measures of accuracy with which types of user identifying information identify online system users, in accordance with an embodiment.

FIG. 4 shows an example of types of user identifying information maintained by an online system 140 for a user as well as links between different types of user identifying information maintained by the online system 140. The example of FIG. 4 shows the online system 140 maintaining an online system user identifier 402, a name 405A, a date of birth 405B, a gender 405C, an address 405D, an email 405E, and a phone number 405F for the user. As further described above in conjunction with FIGS. 2 and 3, the online system 140 also maintains various links between different types of user identifying information. In the example shown by FIG. 4, the online system 140 maintains a link 410A between the online system user identifier 402 and the address 405D, a link 410B between the online system user identifier 402 and the gender 405C, and a link 410C between the online system user identifier 402 and the name 405A. Additionally, the online system 140 maintains a link 410F between the online system user identifier 402 and the phone number 410F and a link 410G between the online system user identifier 402 and the email 410E. In the example of FIG. 4, the online system 140 also maintains a link 410D between the name 405A and the date of birth 405B, as well as a link 410H between the address 405D and the email 405E. As shown in FIG. 4, the online system 140 may maintain links between types of user identifying information provided to the online system 140 by the user and generated by the online system 140 (e.g., links 410A-C, 410E-G) as well as links between types of user identifying information for which the online system 140 received a relationship from at least one source (e.g., links 410D, 410H). Alternatively, the online system 140 maintains links between each pair of types of user identifying information maintained by the online system 140.

As further described above in conjunction with FIG. 3, as the online system 140 receives relationships between different types of user identifying information from sources, the online system 140 generates confidence values associated with links between the different types of user identifying information. The confidence value associated with a link between a type of user identifying information and an alternative type of user identifying information specifies a likelihood of the online system 140 identifying the type of user identifying information from the alternative type of user identifying information, or vice versa. As further described above in conjunction with FIG. 3, the online system 140 generates a confidence value associated with a link between the type of user identifying information and the alternative type of user identifying information based on relationships received from one or more sources that the type of user identifying information is correlated with the alternative type of user identifying information. For example, the online system 140 determines a confidence value associated with the link 410G between the online system user identifier 402 and the email 405E based on a number of relationships received from sources indicating the online system user identifier 402 is correlated with the email 405E. Similarly, the online system 140 determines another confidence value associated with the link 410H between the address 405D and the email 405E based on indications that the address 405D and the email 405E are correlated received from various sources. The online system 140 stores the confidence value associated with a link between a type of user identifying information and an alternative type of user identifying information in association with the link, allowing the online system 140 to identify a likelihood of identifying the type of user identifying information when the alternative type of user identifying information is received, or vice versa. In various embodiments, the online system 140 stores confidence values equaling or exceeding a threshold in association with links between types of user identifying information and does not store confidence values less than the threshold. Alternatively, the online system 140 stores each generated confidence value in association with a link between types of user identifying information for which the confidence value was generated. The online system 140 may store an indication that a confidence value equals or exceeds the threshold in the preceding embodiment.

The online system 140 may modify a confidence value stored in association with a link over time, as further described above in conjunction with FIG. 3. For example, the online system 140 applies a decay factor to the confidence value stored in association with the link to attenuate the confidence value based on a time difference between a current time and times when the online system 140 received indications different types of user identifying information connected by the link were received from various sources. The applied decay factor may be based on the types of user identifying information connected by the link to account for relative frequencies with which values for different types of user identifying information change over time. For example, a larger decay factor is applied to a link that is connected to a type of user identifying information having a value more likely to change over time (e.g., the address 405D, the phone number 405F), while a lower decay factor is applied to another link that is connected to another type of user identifying information having a value that is less likely to change over time (e.g., the date of birth 405B, the email 405E). This allows the online system 140 to update likelihoods of identifying a type of user identifying information from an alternative type of user identifying information over time, improving an ability of the online system 140 to identify a type of user identifying information from another type of user identifying information over time.

CONCLUSION

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:
maintaining, at an online system, a plurality of types of user identifying information each describing a user of the online system;
maintaining links between different types of user identifying information describing the user at the online system, each link between different types of user identifying information describing the user based on relationships between the different types of user identifying information describing the user received by the online system from one or more sources;
receiving, at the online system, relationships between a type of user identifying information describing the user and an alternative type of user identifying information describing the user from a set of sources;
determining a number of received relationships indicating the type of user identifying information describing the user is correlated with the alternative type of user identifying information identify the user;
generating a confidence value for a link between the type of user identifying information and the alternative type of information based on the determined number; and
storing the confidence value in association with the link between the type of user identifying information and the alternative type of user identifying information at the online system.

2. The method of claim 1, wherein generating the confidence value for a link between the type of user identifying information and the alternative type of user identifying information based on the determined number comprises:
identifying a source from which each received relationship indicating the type of user identifying information describing the user is correlated with the alternative type of user identifying information identify the user was received;
determining an accuracy for each identified source, the accuracy for an identified source based on characteristics of the identified source;
weighting each received relationship indicating the type of user identifying information describing the user is correlated with the alternative type of user identifying information identify the user by the accuracy for the identified source from which the relationship indicating the type of user identifying information describing the user is correlated with the alternative type of user identifying information identify the user was received; and
generating the confidence value based on the weighted received relationships indicating the type of user identifying information describing the user is correlated with the alternative type of user identifying information identify the user.

3. The method of claim 2, wherein determining the accuracy for each identified source comprises:
determining a higher accuracy for sources identifying specific mechanisms for providing relationships between user identifying information to the online system relative to accuracies for sources identifying other mechanisms for providing relationships between user identifying information to the online system.

4. The method of claim 3, wherein a specific mechanism for providing relationships between user identifying information to the online system is selected from a group consisting of: instructions that, when executed by a client device, cause the client device to transmit a relationship between the type of user identifying information and the alternative type of user identifying information, including the relationship between the type of user identifying information and the alternative type of user identifying information in information identifying an action performed by the user, and any combination thereof.

5. The method of claim 2, wherein determining the accuracy for each identified source comprises:
receiving the accuracy for one or more of the sources from a trusted third party system.

6. The method of claim 1, further comprising:
storing an indication the confidence value associated with the link between the type of user identifying information and the alternative type of user identifying information equals or exceeds a threshold.

7. The method of claim 1, further comprising:
modifying the confidence value associated with the link between the type of user identifying information and the alternative type of user identifying information based on time differences between a current time and times when the online system received relationships indicating the type of user identifying information describing the user is correlated with the alternative type of user identifying information identify the user from the sources.

8. The method of claim 7, wherein modifying the confidence value associated with the link between the type of user identifying information and the alternative type of user identifying information based on time differences between the current time and times when the online system received relationships indicating the type of user identifying information describing the user is correlated with the alternative type of user identifying information identify the user from the sources comprises:
applying a decay factor to the confidence value that decreases the confidence value as the time difference between the current time and a time when the when the online system received relationships indicating the type of user identifying information describing the user is correlated with the alternative type of user identifying information identify the user from the sources increases.

9. The method of claim 8, wherein the decay factor is based on one or more of a group consisting of: the type of user identifying information, the alternative type of user identifying information, and any combination thereof.

10. The method of claim 1, wherein the online system receives values for the type of user identifying information and for the alternative type of user identifying information along with relationships between the type of user identifying information and the alternative type of user identifying information from the set of sources, and storing the confidence value in association with the link between the type of user identifying information and the alternative type of user identifying information at the online system comprises:
storing the confidence value in association with the link between the type of user identifying information and the alternative type of user identifying information at the online system and discarding values for the type of user identifying information and for the alternative type of user identifying information received from the set of sources.

11. A computer program product comprising a non-transitory computer readable storage system having instructions encoded thereon that, when executed by a processor, cause the processor to:
- maintain, at an online system, a plurality of types of user identifying information each describing a user of the online system;
- maintain links between different types of user identifying information describing the user at the online system, each link between different types of user identifying information describing the user based on relationships between the different types of user identifying information describing the user received by the online system from one or more sources;
- receive, at the online system, relationships between a type of user identifying information describing the user and an alternative type of user identifying information describing the user from a set of sources;
- determine a number of received relationships indicating the type of user identifying information describing the user is correlated with the alternative type of user identifying information identify the user;
- generate a confidence value for a link between the type of user identifying information and the alternative type of information based on the determined number; and
- store the confidence value in association with the link between the type of user identifying information and the alternative type of user identifying information at the online system.

12. The computer program product of claim 11, wherein generate the confidence value for a link between the type of user identifying information and the alternative type of user identifying information based on the determined number comprises:
- identify a source from which each received relationship indicating the type of user identifying information describing the user is correlated with the alternative type of user identifying information identify the user was received;
- determine an accuracy for each identified source, the accuracy for an identified source based on characteristics of the identified source;
- weight each received relationship indicating the type of user identifying information describing the user is correlated with the alternative type of user identifying information identify the user by the accuracy for the identified source from which the relationship indicating the type of user identifying information describing the user is correlated with the alternative type of user identifying information identify the user was received; and
- generate the confidence value based on the weighted received relationships indicating the type of user identifying information describing the user is correlated with the alternative type of user identifying information identify the user.

13. The computer program product of claim 12, wherein determine the accuracy for each identified source comprises:
- determine a higher accuracy for sources identifying specific mechanisms for providing relationships between user identifying information to the online system relative to accuracies for sources identifying other mechanisms for providing relationships between user identifying information to the online system.

14. The computer program product of claim 13, wherein a specific mechanism for providing relationships between user identifying information to the online system is selected from a group consisting of: instructions that, when executed by a client device, cause the client device to transmit a relationship between the type of user identifying information and the alternative type of user identifying information, including the relationship between the type of user identifying information and the alternative type of user identifying information in information identifying an action performed by the user, and any combination thereof.

15. The computer program product of claim 12, wherein determine the accuracy for each identified source comprises:
- receive the accuracy for one or more of the sources from a trusted third party system.

16. The computer program product of claim 11, wherein the non-transitory computer readable storage medium further has instructions encoded thereon that, when executed by the processor, cause the processor to:
- store an indication the confidence value associated with the link between the type of user identifying information and the alternative type of user identifying information equals or exceeds a threshold.

17. The computer program product of claim 11, wherein the non-transitory computer readable storage medium further has instructions encoded thereon that, when executed by the processor, cause the processor to:
- modify the confidence value associated with the link between the type of user identifying information and the alternative type of user identifying information based on time differences between a current time and times when the online system received relationships indicating the type of user identifying information describing the user is correlated with the alternative type of user identifying information identify the user from the sources.

18. The computer program product of claim 17, wherein modify the confidence value associated with the link between the type of user identifying information and the alternative type of user identifying information based on time differences between the current time and times when the online system received relationships indicating the type of user identifying information describing the user is correlated with the alternative type of user identifying information identify the user from the sources comprises:
- apply a decay factor to the confidence value that decreases the confidence value as the time difference between the current time and a time when the when the online system received relationships indicating the type of user identifying information describing the user is correlated with the alternative type of user identifying information identify the user from the sources increases.

19. The computer program product of claim 18, wherein the decay factor is based on one or more of a group consisting of: the type of user identifying information, the alternative type of user identifying information, and any combination thereof.

20. The computer program product of claim 11, wherein the online system receives values for the type of user identifying information and for the alternative type of user identifying information along with relationships between the type of user identifying information and the alternative type of user identifying information from the set of sources, and store the confidence value in association with the link between the type of user identifying information and the alternative type of user identifying information at the online system comprises:
- store the confidence value in association with the link between the type of user identifying information and the alternative type of user identifying information at the online system and discarding values for the type of user identifying information and for the alternative type of user identifying information received from the set of sources.

\* \* \* \* \*